(12) United States Patent
Li

(10) Patent No.: US 8,602,441 B2
(45) Date of Patent: Dec. 10, 2013

(54) TANDEM STROLLER

(75) Inventor: Jian-Qun Li, Taipei (TW)

(73) Assignee: Wonderland Nurserygoods Company, Central (HK)

( * ) Notice: Subject to any disclaimer, the term of this patent is extended or adjusted under 35 U.S.C. 154(b) by 108 days.

(21) Appl. No.: 12/804,624

(22) Filed: Jul. 26, 2010

(65) Prior Publication Data

US 2011/0025022 A1 Feb. 3, 2011

Related U.S. Application Data

(60) Provisional application No. 61/229,709, filed on Jul. 29, 2009.

(51) Int. Cl.
*B62B 1/00* (2006.01)

(52) U.S. Cl.
USPC .......................... 280/642; 280/658; 280/47.4

(58) Field of Classification Search
USPC .......................... 280/642, 647–650, 657, 658, 280/47.38–47.71
See application file for complete search history.

(56) References Cited

U.S. PATENT DOCUMENTS

| | | | | |
|---|---|---|---|---|
| 3,223,431 A | * | 12/1965 | Gottfried et al. | 280/47.38 |
| 4,542,915 A | * | 9/1985 | Wheeler et al. | 280/642 |
| 4,725,071 A | * | 2/1988 | Shamie | 280/643 |
| 4,858,947 A | * | 8/1989 | Yee et al. | 280/643 |
| 4,886,289 A | * | 12/1989 | Yee et al. | 280/643 |
| 5,221,106 A | * | 6/1993 | Shamie | 280/644 |
| 5,333,893 A | * | 8/1994 | Chen | 280/642 |
| 5,417,449 A | * | 5/1995 | Shamie | 280/642 |
| D360,392 S | * | 7/1995 | Lewandowski | D12/129 |
| 5,624,152 A | * | 4/1997 | Yoshie et al. | 297/184.13 |
| 5,887,935 A | * | 3/1999 | Sack | 296/122 |
| 6,086,087 A | * | 7/2000 | Yang | 280/658 |
| 6,267,406 B1 | * | 7/2001 | Huang | 280/647 |
| 6,530,591 B2 | * | 3/2003 | Huang | 280/650 |
| 6,843,498 B2 | * | 1/2005 | Bretschger et al. | 280/642 |
| 6,935,652 B2 | * | 8/2005 | Fair et al. | 280/642 |
| 7,475,900 B2 | * | 1/2009 | Cheng | 280/642 |
| 2001/0013688 A1 | * | 8/2001 | Warner et al. | 280/47.38 |
| 2003/0020259 A1 | * | 1/2003 | Tai et al. | 280/647 |
| 2006/0226635 A1 | * | 10/2006 | Huang | 280/642 |
| 2006/0290107 A1 | * | 12/2006 | Powers | 280/658 |
| 2009/0039620 A1 | * | 2/2009 | Ryan et al. | 280/647 |
| 2010/0038886 A1 | * | 2/2010 | Greger et al. | 280/642 |
| 2010/0078916 A1 | * | 4/2010 | Chen | 280/648 |
| 2010/0244393 A1 | * | 9/2010 | Thomas et al. | 280/33.993 |

\* cited by examiner

*Primary Examiner* — Katy M Ebner
(74) *Attorney, Agent, or Firm* — Hudak, Shunk & Farine Co. LPA

(57) ABSTRACT

A tandem stroller (1) includes a frame (11), a pair of front and rear seats (15, 16) disposed on the frame (11), a plurality of front wheels (12), and a plurality of rear wheels (13). The frame (11) includes a side rod unit (111), a pair of front leg rods (112) connected to the side rod unit (111), a pair of rear leg rods (113) connected to the side rod unit (111), and a push rod (14). The front and rear wheels (12, 13) are disposed respectively on the front and rear leg rods (112, 113). The push rod (14) is connected to the rear leg rods (113). The front seat (15) includes a front seat plate (151) disposed on the frame (11), and a front backrest (152) connected to and disposed behind the front seat plate (151). The rear seat (16) includes a rear seat plate (161) disposed behind the front seat (15) and above the front seat plate (161), and a rear backrest (162) connected to and disposed in front of the rear seat plate (161).

12 Claims, 7 Drawing Sheets

TANDEM STROLLER

CROSS-REFERENCE TO RELATED APPLICATION

This application claims priority of U.S. provisional application No. 61/229,709, filed on Jul. 29, 2009.

BACKGROUND OF THE INVENTION

1. Field of the Invention

This invention relates to a tandem stroller, and more particularly to a foldable tandem stroller.

2. Description of the Related Art

U.S. Pat. Nos. 6,979,017, 6,843,498, 6,267,406, 5,417,449, and 4,542,915 disclose tandem strollers, each of which includes front and rear seats for supporting two children, respectively, such that the children face forwardly. To provide comfort to the child seated on the rear seat, the distance between the front and rear seats must be relatively large. As a result, the total length of the stroller in a front-to-rear direction is increased.

SUMMARY OF THE INVENTION

The object of this invention is to provide a tandem stroller that has a shortened length in a front-to-rear direction.

According to this invention, there is provided a tandem stroller comprising a frame, a pair of front and rear seats disposed on the frame, a plurality of front wheels, and a plurality of rear wheels, the frame including a side rod unit, a pair of front leg rods connected to the side rod unit, a pair of rear leg rods connected to the side rod unit, and a push rod, the front and rear wheels being disposed respectively on the front and rear leg rods, the push rod being connected to the rear leg rods.

The front seat includes a front seat plate disposed on the frame, and a front backrest connected to and disposed behind the front seat plate. The rear seat includes a rear seat plate disposed behind the front seat and above the front seat plate, and a rear backrest connected to and disposed in front of the rear seat plate. As such, the total length of the stroller in a front-to-rear direction is shortened.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
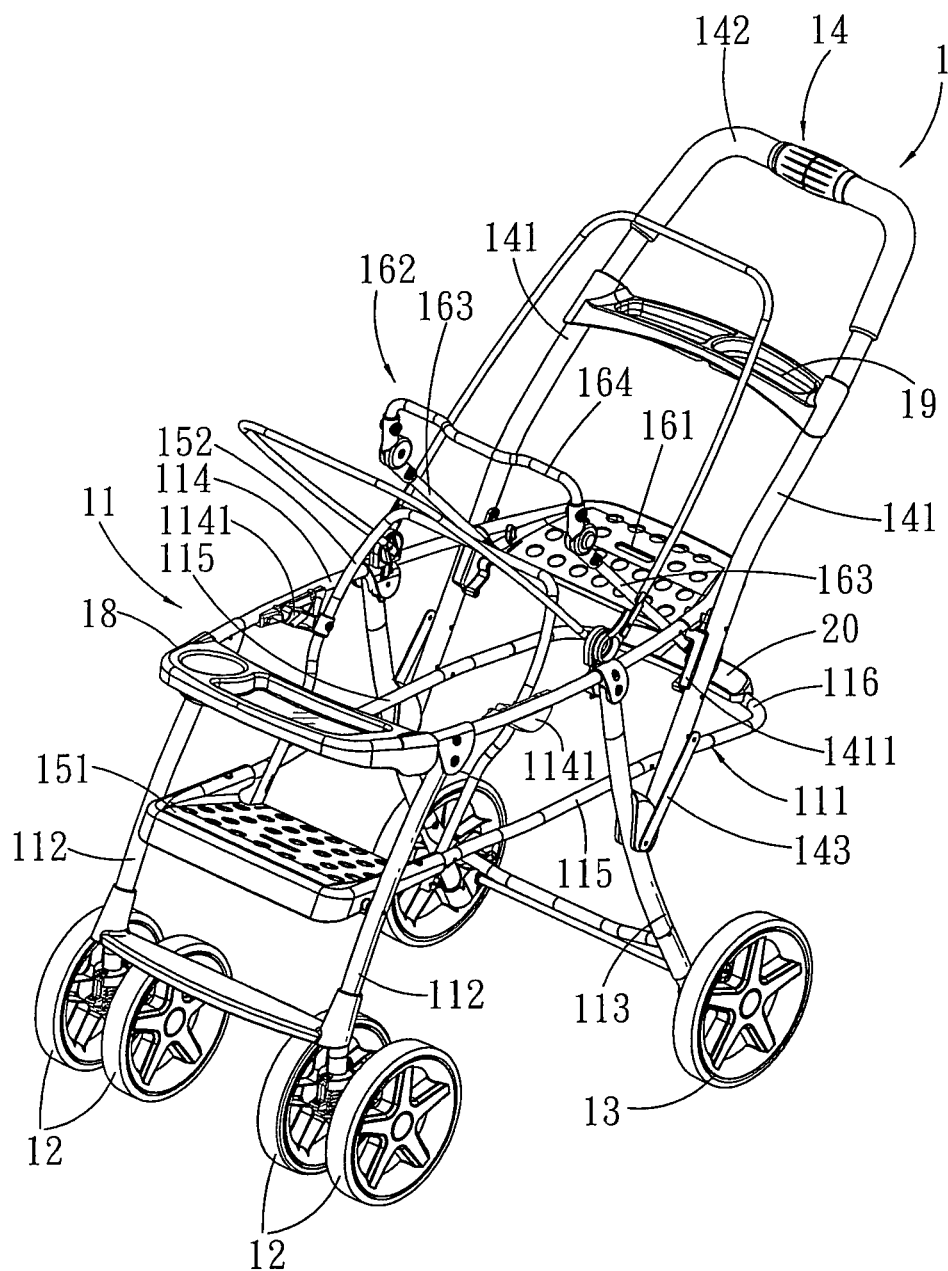
FIG. 1 is a perspective view of the first preferred embodiment of a tandem stroller according to this invention in an unfolded state.

Before the present invention is described in greater detail in connection with the preferred embodiments, it should be noted that similar elements and structures are designated by like reference numerals throughout the entire disclosure.

Figure 2:
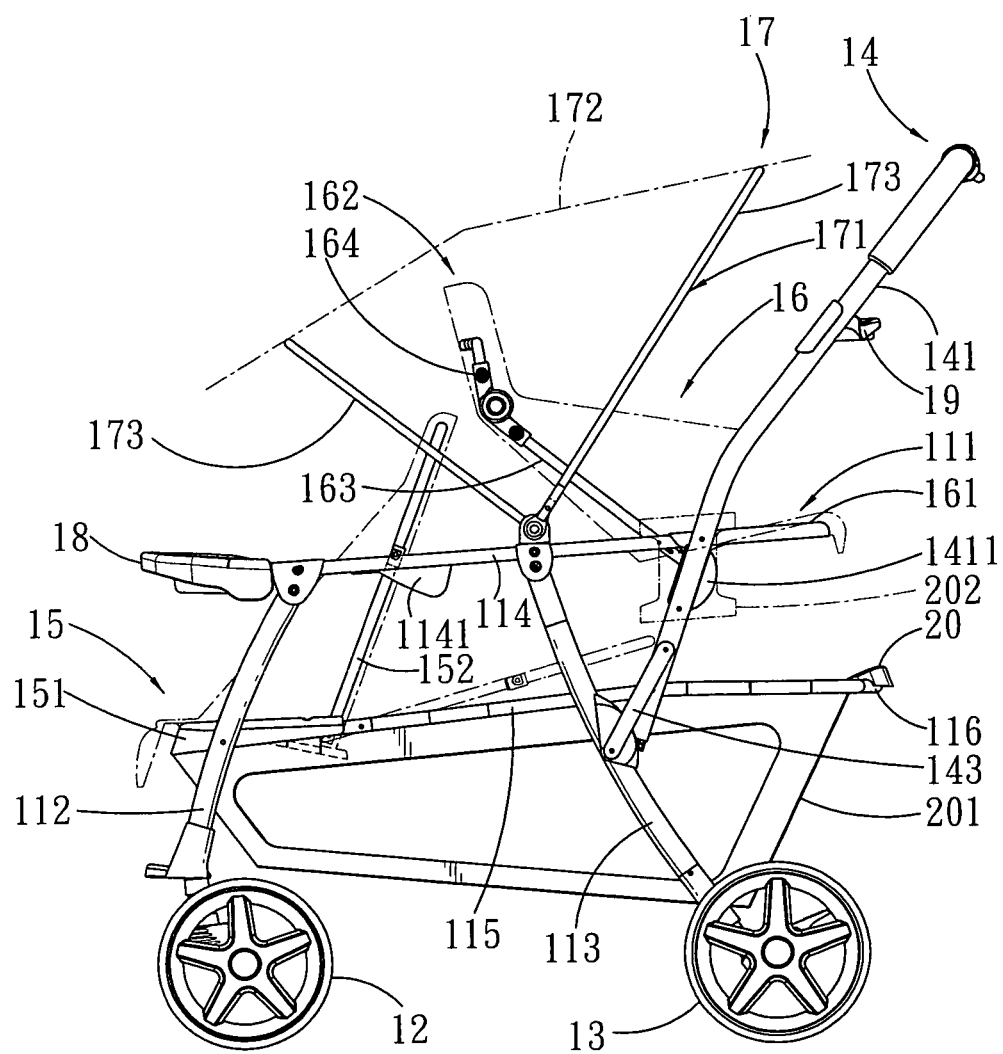
FIG. 2 is a side view of the first preferred embodiment in the unfolded state.

Referring to FIGS. 1 and 2, the first preferred embodiment of a tandem stroller 1 according to this invention includes a frame 11, a plurality of front wheels 12, a plurality of rear wheels 13, a front seat 15, a rear seat 16, and a canopy 17.

The frame 11 includes a side rod unit 111, a pair of front leg rods 112 connected to the side rod unit 111, a pair of rear leg rods 113 connected to the side rod unit 111, and a push rod 14. The side rod unit 111 includes a pair of upper side rods 114 spaced apart from each other in a left-to-right direction and extending in a horizontal direction, a pair of lower side rods 115 disposed respectively under the upper side rods 114, and a support rod 116 connected between rear ends of the lower side rods 115. The front leg rods 112 have top ends connected respectively and pivotally to the upper side rods 114. Each of the front leg rods 112 has an intermediate portion connected pivotally to the corresponding lower side rod 115. Top ends of the rear leg rods 113 are connected respectively and pivotally to the upper side rods 114. The front wheels 12 are connected respectively and pivotally to bottom ends of the front leg rods 112. The rear wheels 13 are connected respectively and pivotally to bottom ends of the rear leg rods 113.

The push rod 14 is generally inverted U-shaped, and includes two upright side rod portions 141 spaced apart from each other in the left-to-right direction, and a top rod portion 142 connected between top ends of the side rod portions 141. Each of the side rod portions 141 has a bottom end portion connected pivotally to the corresponding rear leg rod 113 by a connecting plate 143. Each of the connecting plates 143 has a front end connected to the corresponding rear leg rod 113, and a rear end connected to the corresponding side rod portion 141, such that the junction between the corresponding connecting plate 143 and the corresponding side rod portion 141 is disposed above that between the corresponding connecting plate 143 and the corresponding rear leg rod 113. Each of the side rod portions 141 further has an intermediate portion connected pivotally to the corresponding upper side rod 114 and the corresponding lower side rod 115 at two positions thereof, respectively.

The front seat 15 includes a front seat plate 151 disposed between and aligned with front end portions of the lower side rods 115, and a front backrest 152 disposed behind the front seat plate 151 and inclined upwardly and rearwardly. The front backrest 152 is generally inverted U-shaped, and has two ends connected respectively and pivotally to the lower side rods 115, and two sides each connected selectively to the corresponding upper side rod 114 by a positioning seat 1141 disposed on a front end of the corresponding upper side rod 114. The positioning seat 1141 has a plurality of positioning grooves (not shown), each of which is able to engage the corresponding side of the front backrest 152, such that the inclination angle of the front backrest 152 relative to the front seat plate 151 can be adjusted.

The rear seat 16 is disposed behind the front seat 15, and includes a rear seat plate 161 disposed between and aligned with rear end portions of the upper side rods 114, and a rear backrest 162 disposed in front of the rear seat plate 161 and inclined upwardly and forwardly. In other words, the front and rear backrests 152, 162 are adjacent to each other, and are disposed between the front and rear seat plates 151, 161. In this embodiment, the rear backrest 162 includes two lower sections 163 spaced apart from each other and connected respectively and pivotally to the upper side rods 114, and a generally inverted U-shaped upper section 164 connected pivotally to top ends of the lower sections 163 in such a manner to allow for forward and rearward pivoting movement of the upper section 164 relative to the lower sections 163. Two sides of the rear backrest 162 are connected respectively and adjustably to the side rod portions 141 of the push rod 14 by two positioning seats 1411 disposed respectively on the side rod portions 141. The positioning seat 1411 also has a plurality of positioning grooves (not shown), each of which is able to engage the corresponding side of the rear backrest 162, such that the inclination angle of the rear backrest 162 relative to the rear seat plate 161 can be adjusted. In this embodiment, front ends of the upper side rods 114 are disposed directly above the front seat plate 151, and rear ends of the lower side rods 115 are disposed respectively under the rear seat plate 161.

As described above, the rear seat plate 161 is disposed on the upper side rods 114, and the front seat plate 151 is disposed on the lower side rods 115 and below the rear seat plate 161, such that the rear seat 16 is higher than the front seat 15. It should be noted that, the front and rear backrests 152, 162 face away from each other and the front and rear backrests 152, 162 are positioned relative to each other such that contact therebetween is prevented during angle adjustment thereof. Consequently, the total length of the stroller 1 in a front-to-rear direction is shortened significantly. Furthermore, since the children seated respectively on the front and rear seat plates 151, 161 face away from each other, movement of the child seated on the rear seat plate 161 cannot be obstructed by the front seat 15. Further, the front and rear backrests 152, 162 can be adjusted simultaneously to horizontal positions to allow the children to lie on the front and rear seats 15, 16, respectively, thereby resulting in convenience during use of the stroller 1.

The canopy 17 includes a canopy frame 171 and a canopy cover 172. The canopy frame 171 includes two canopy rods 173 connected respectively and pivotally to middle portions of the upper side rods 114. The canopy cover 172 is supported on the canopy frame 171, and has a portion disposed directly above the front seat 15, and another portion disposed directly above the rear seat 16 for covering over the children. Since the front and rear seats 15, 16 are covered by the same canopy 17, the structure of the stroller 1 is simplified.

In this embodiment, the stroller 1 further includes a front food tray 18, a rear food tray 19, and a support cushion 20. The front food tray 18 is disposed between front ends of the upper side rods 114 of the side rod unit 111 to allow for use of the child seated on the front seat 15. The rear food tray 19 is disposed between the side rod portions 141 of the push rod 14. The support cushion 20 is disposed on the support rod 116. The stroller 1 may further include a bottom storage basket 201 (see FIG. 2) connected with and disposed under the lower side rods 11 and between the front wheels 12 and the rear wheels 13, and a cup rack 202 (see FIG. 2) is disposed on the side rod unit 111.

When it is desired to fold the stroller 1, a locking device (not shown) is operated to release the push rod 14 from the rear leg rods 113, followed by pivoting the push rod 14 downwardly. Hence, the movement of the push rod 14 and the connecting plates 143 is activated to drive upward pivoting movement of the front ends of the upper and lower side rods 114, 115 and to make the upper and lower side rods 114, 115 and the rear leg rods 113 to move closer to each other. At the same time, the front leg rods 112 are moved to positions disposed above the rear leg rods 113, such that the front wheels 12 are disposed above the rear wheels 13.

When an assembly of the front leg rods 112, the rear leg rods 113, the side rod unit 111, and the push rod 14 is converted into a folded state shown in FIG. 3, the junction between the corresponding connecting plate 143 and the corresponding side rod portion 141 is disposed below that between the corresponding connecting plate 143 and the corresponding rear leg rod 113. Also in the folded state, with particular reference to FIG. 3, the support cushion 20 is adjacent to and spaced apart from the rear wheels 13, and the support cushion 20 and the rear wheels 13 are disposed above and in contact with a support surface (A) to support the folded stroller 1. As such, the folded stroller 1 is configured as a wheeled upright unit that is convenient to store and transport.

Figure 4:
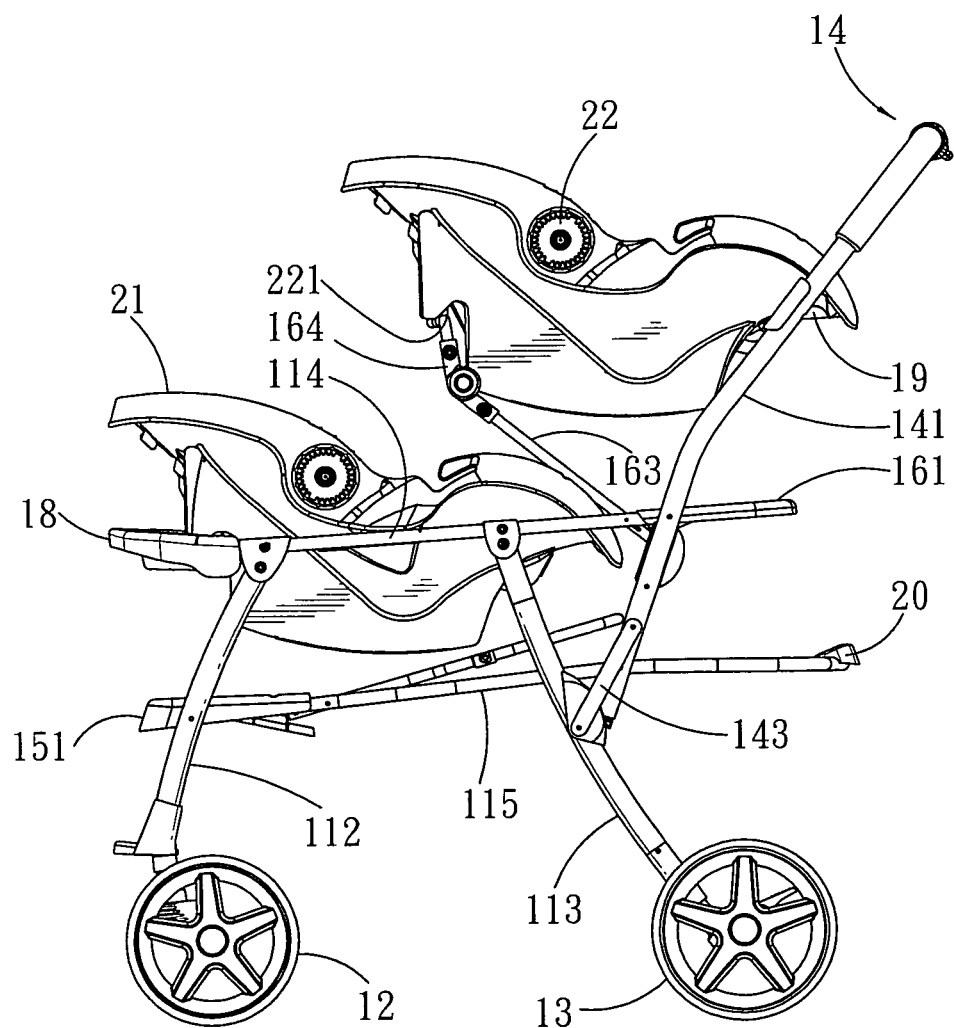
FIG. 4 is a side view of the first preferred embodiment and two car safety seats.

In this embodiment, the canopy 17 is disposed pivotally on the upper side rods 114. Referring to FIGS. 1 and 4, when the stroller 1 is in an unfolded state, by removing the canopy 17 from the upper side rods 114 and pivoting the upper section 164 of the rear backrest 162 relative to the lower sections 163 to form an angle therebetween, first and second car safety seats 21, 22 can be connected with the stroller 1. With particular reference to FIG. 4, the first car safety seat 21 is disposed between and supported by the upper side rods 114, and has a bottom portion abutting against the front food tray 18. The second car safety seat 22 has front and rear end portions abutting respectively against the upper section 164 and the rear food tray 19, and is disposed above the first car safety seat 21. It should be noted that, due to the angle formed between the upper section 164 and the lower sections 163 of the rear backrest 162, the upper section 164 of the rear backrest 162 could be inserted into a recess 221 in a bottom portion of the second car safety seat 22.

Figure 5:
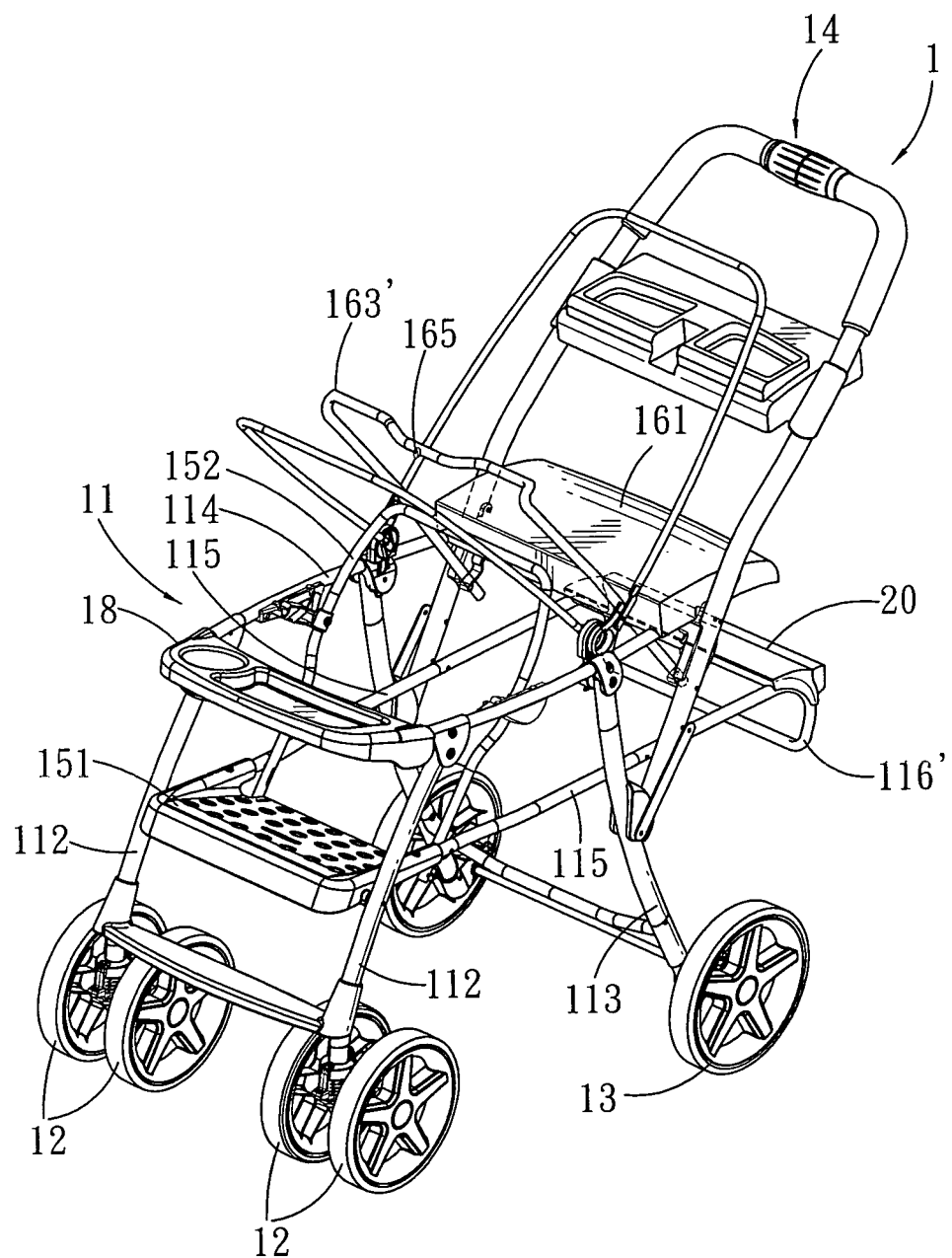
FIG. 5 is a perspective view of the second preferred embodiment of a tandem stroller according to this invention in an unfolded state.
Figure 6:
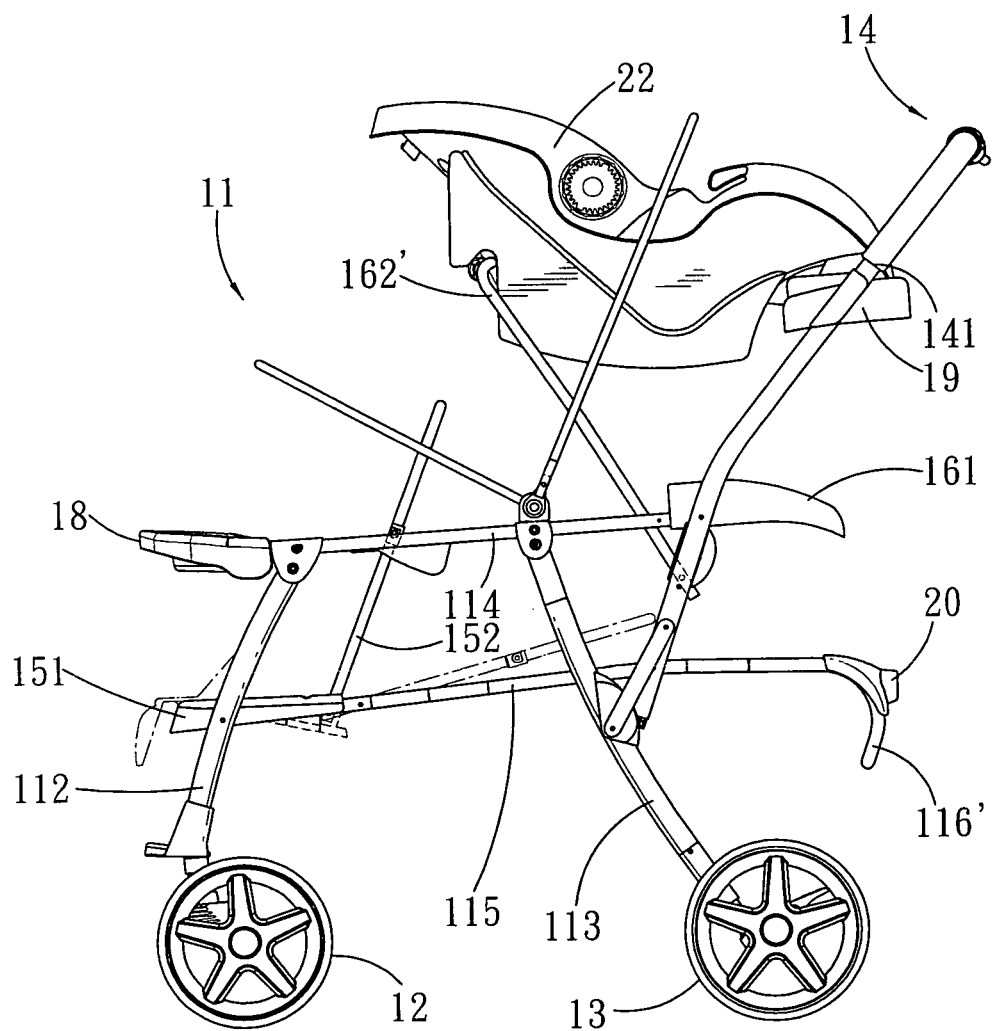
FIG. 6 is a side view of the second preferred embodiment and a car safety seat.
Figure 7:
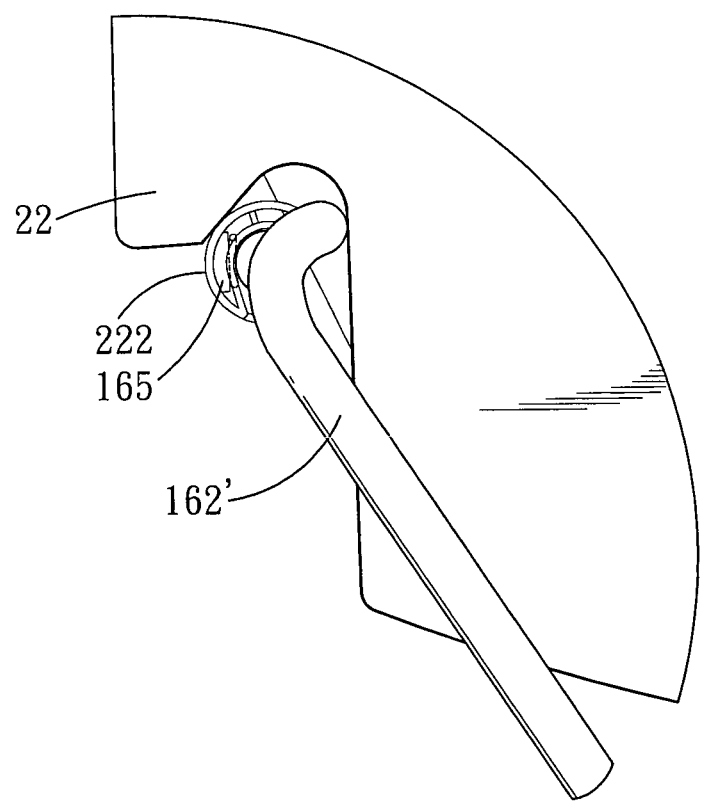
FIG. 7 is a schematic side view illustrating a connection between the car seat and a rear backrest of the second preferred embodiment.

FIGS. 5, 6, and 7 show the second preferred embodiment of a tandem stroller 1 according to this invention, which is similar in construction to the first preferred embodiment except for the rear backrest 162' and the support rod 116'. The rear backrest 162' is configured as an inverted U-shaped rod, and is formed with a retaining block 165 at a center of a top of the rear backrest 162'. When the second safety seat 22 is disposed on and connected with the frame 11, a hook 222 of the second safety seat 22 is retained on the retaining block 165 to facilitate positioning of the second safety seat 22 on the frame 11.

Figure 3:
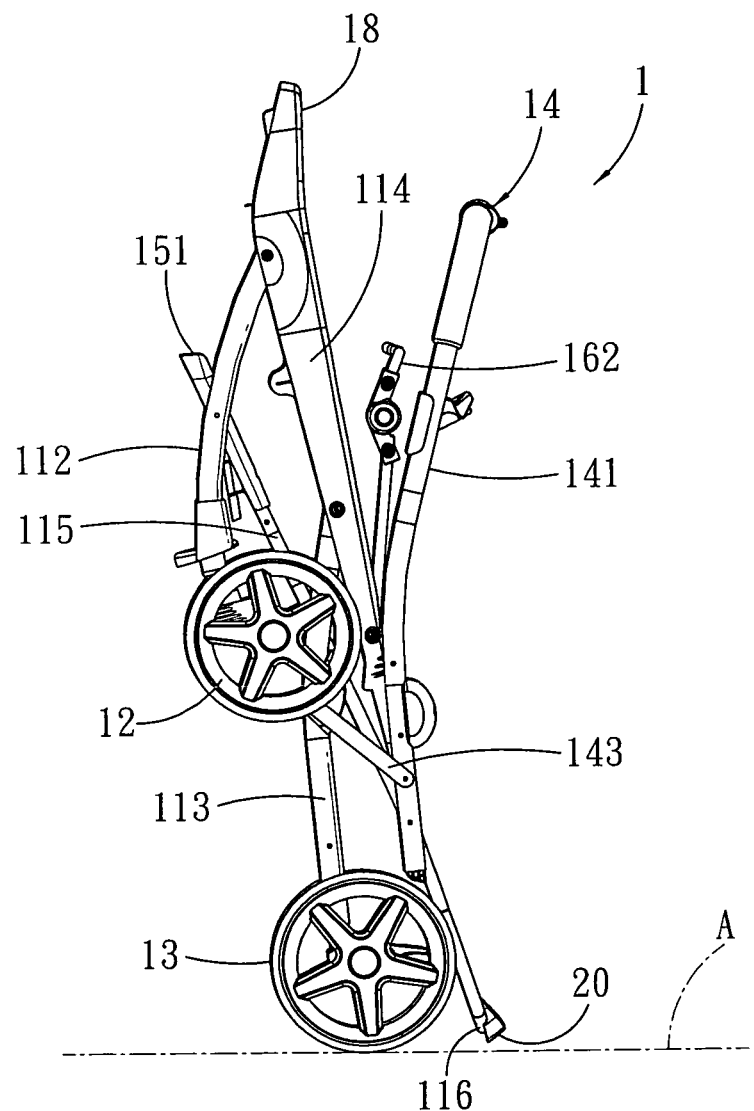
FIG. 3 is a side view of the first preferred embodiment in a folded state.

The support rod 116' is U-shaped, and is connected fixedly to and extends downwardly from the rear ends of the lower side rods 115 such that, when the stroller 1 is folded, the support rod 116' and the support cushion 20 are in contact with the support surface (A) (see FIG. 3) so as to allow the frame 11 to be supported stably on the support surface (A) (see FIG. 3).

With this invention thus explained, it is apparent that numerous modifications and variations can be made without departing from the scope and spirit of this invention. It is therefore intended that this invention be limited only as indicated by the appended claims.

I claim:

1. A tandem stroller comprising a frame, a pair of front and rear seats disposed on said frame, a plurality of front wheels, and a plurality of rear wheels, said frame including a side rod unit, having a pair of upper side rods and a pair of lower side rods spaced apart from and disposed respectively under said upper side rods, a pair of front leg rods connected to said upper side rod unit, a pair of rear leg rods connected to said pair of upper side rods, and a push rod, said front and rear wheels being disposed respectively on said front and rear leg rods, said push rod being connected to said rear leg rods at a location below said upper side rod, and wherein said push rod is not directly connected to said front leg rods;
- wherein said front seat includes a front seat plate disposed between and aligned with a front part of each of said lower side rods, and a front backrest connected to and disposed behind said front seat plate;
- wherein said rear seat includes a rear seat plate disposed behind Said front seat, above said front seat plate, and between and aligned with each of said upper side rods, and a rear backrest connected to said frame and disposed in front of said rear seat plate;
- wherein when said front backrest is inclined upwardly and rearwardly, and said rear backrest is inclined upwardly and forwardly, and faces rearwardly, said front and rear backrests are spaced apart in a vertical direction and do not interfere with each other; and
- wherein said inclined rear backrest is located in front of said rear seat plate.

2. The tandem stroller as claimed in claim 1, wherein said front and rear backrests are disposed adjacent to each other and between said front and rear seat plates, said front backrest being connected adjustably to said upper side rods so as to allow for adjustment in inclination angle of said front backrest relative to said front seat plate.

3. The tandem stroller as claimed in claim 2, wherein said push rod has two upright side rod portions spaced apart from each other in a left-to-right direction, and a top rod portion interconnecting top ends of said side rod portions, Said side rod portions being connected respectively to said rear leg rods, each of said side rod portions having an intermediate portion connected pivotally to a corresponding one of said upper side rods and a corresponding one of said lower side rods at two positions thereof, respectively.

4. The tandem stroller as claimed in claim 2, wherein said rear backrest is connected pivotally to said upper side rods.

5. The tandem stroller as claimed in claim 4, wherein said rear backrest is configured as an inverted U-shaped rod.

6. The tandem stroller as claimed in claim 4, wherein said rear backrest includes two lower sections connected respectively to said upper side rod portions and spaced apart from each other, and a generally inverted U-shaped upper section connected pivotally to top ends of said lower sections in such a manner to allow for forward and rearward pivoting movement of said upper section relative to said lower sections.

7. The tandem stroller as claimed in claim 2, wherein each of said front leg rods has a top end connected to a respective one of said upper side rods, and an intermediate portion connected to a respective one of said lower side rods, and said rear leg rods have top ends connected respectively to said upper side rods.

8. The tandem stroller as claimed in claim 1, further comprising a canopy, said canopy including a canopy frame disposed on said frame, and a canopy cover disposed on said canopy frame, said canopy cover having a portion disposed directly above said front seat, and another portion disposed directly above said rear seat.

9. The tandem stroller as claimed in claim 2, wherein said lower side rods have rear ends disposed under said rear seat plate, said side rod unit further includes a support rod connected between said rear ends of said lower side rods such that, when said tandem stroller is converted into a folded state, said support rod and said rear wheels are in contact with a support surface.

10. The tandem stroller as claimed in claim 9, wherein said support rod is U-shaped.

11. The tandem stroller as claimed in claim 9, further comprising a support cushion disposed on said support rod such that, when said tandem stroller is converted into the folded state, said support cushion and said rear wheel are in contact with said support surface.

12. The tandem stroller as claimed in claim 2, wherein said upper side rods have front ends disposed directly above said front seat plate, said tandem stroller further comprising a front tray disposed between said front ends of said upper side rods.

* * * * *